(12) United States Patent
Meyer et al.

(10) Patent No.: US 11,571,940 B2
(45) Date of Patent: Feb. 7, 2023

(54) CHASSIS CONTROL ARM AND METHOD FOR THE PRODUCTION OF A CHASSIS CONTROL ARM

(71) Applicant: Benteler Automobiltechnik GmbH, Paderborn (DE)

(72) Inventors: Stephan Meyer, Bielefeld (DE); Erik Walter, Neuss (DE); Frode Paulsen, Gjøvik (NO); Arne Schnieders, Bielefeld (DE)

(73) Assignee: BENTELER AUTOMOBIL TECHNIK GMBH, Paderborn (DE)

( * ) Notice: Subject to any disclaimer, the term of this patent is extended or adjusted under 35 U.S.C. 154(b) by 77 days.

(21) Appl. No.: 16/998,757

(22) Filed: Aug. 20, 2020

(65) Prior Publication Data
US 2021/0053408 A1 Feb. 25, 2021

(30) Foreign Application Priority Data
Aug. 23, 2019 (DE) ................... 10 2019 122 721.6

(51) Int. Cl.
*B60G 7/00* (2006.01)
(52) U.S. Cl.
CPC ........ *B60G 7/001* (2013.01); *B60G 2204/418* (2013.01); *B60G 2206/012* (2013.01); *B60G 2206/122* (2013.01); *F16C 2326/05* (2013.01)
(58) Field of Classification Search
CPC ............. B60G 7/001; B60G 2204/418; B60G 2206/012; B60G 2206/122; B60G 2206/8105; F16C 2326/05; F16C 11/0695
See application file for complete search history.

(56) References Cited

U.S. PATENT DOCUMENTS

| | | | | |
|---|---|---|---|---|
| 10,814,535 B2* | 10/2020 | Lee | ........................ | B29C 45/14 |
| 2002/0136592 A1 | 9/2002 | Abels | | |
| 2003/0034625 A1* | 2/2003 | Runte | .................... | B60G 7/001 |
| | | | | 280/124.134 |
| 2006/0175786 A1* | 8/2006 | Streubel | ................. | B60G 7/001 |
| | | | | 264/254 |

(Continued)

FOREIGN PATENT DOCUMENTS

| | | |
|---|---|---|
| DE | 197 20 134 | 11/1997 |
| DE | 199 61 425 | 7/2001 |

(Continued)

*Primary Examiner* — Darlene P Condra
(74) *Attorney, Agent, or Firm* — Henry M. Feiereisen LLC

(57) ABSTRACT

A chassis control arm includes a single-piece base body with several hollow chambers. The base body includes a plurality of bearing mounts. A first bearing mount is formed by one of the hollow chambers and traverses the base body to define a first bearing axis which extends in extrusion direction. A second bearing mount in a first end portion of the base body defines a second bearing axis in a direction which deviates from the extrusion direction of the hollow profile. A third bearing mount is positioned in a second end portion of the base body. The base body has a center portion which includes the first bearing mount and is arranged between the first and second end portions. The base body has a first leg extending from the first end portion to the center portion, and a second leg extending from the second end portion to the center portion.

11 Claims, 5 Drawing Sheets

(56) References Cited

U.S. PATENT DOCUMENTS

| | | | | |
|---|---|---|---|---|
| 2010/0084834 A1* | 4/2010 | Ersoy | ............... | B60G 7/001 |
| | | | | 280/124.1 |
| 2012/0098228 A1* | 4/2012 | Wilson | ............... | B60G 7/005 |
| | | | | 280/124.134 |
| 2012/0299264 A1 | 11/2012 | Pedersen et al. | | |
| 2015/0283595 A1* | 10/2015 | Haselhorst | ............ | B21D 53/88 |
| | | | | 156/196 |
| 2016/0101660 A1* | 4/2016 | Wolf-Monheim | ..... | B60G 7/001 |
| | | | | 280/124.125 |
| 2018/0154718 A1* | 6/2018 | Kwon | .................. | F16D 3/22 |
| 2018/0326803 A1 | 11/2018 | Meyer et al. | | |

FOREIGN PATENT DOCUMENTS

| | | |
|---|---|---|
| DE | 102006051609 | 5/2008 |
| DE | 102010006284 | 8/2011 |
| DE | 102010051884 | 5/2012 |
| DE | 102017109996 | 11/2018 |
| DE | 102017127788 | 5/2019 |
| EP | 2 995 481 | 3/2016 |
| JP | 09315123 A * | 12/1997 |

* cited by examiner

CHASSIS CONTROL ARM AND METHOD FOR THE PRODUCTION OF A CHASSIS CONTROL ARM

CROSS-REFERENCES TO RELATED APPLICATIONS

This application claims the priority of German Patent Application, Serial No. 10 2019 122 721.6, filed Aug. 23, 2019, pursuant to 35 U.S.C. 119(a)-(d), the disclosure of which is incorporated herein by reference in its entirety as if fully set forth herein.

BACKGROUND OF THE INVENTION

The present invention relates to a chassis control arm, in particular a transverse control arm, and to a method for the production of such a control arm.

The following discussion of related art is provided to assist the reader in understanding the advantages of the invention, and is not to be construed as an admission that this related art is prior art to this invention.

Chassis control arms, also referred to as motor vehicle control arms, are generally designed by way of single-shell or multi-shell metal sheet construction or as forged component in the form of a forged control arm. Typically, such a chassis control arm has a base body with bearing mounts for 2 to 3 bearings.

It would be desirable and advantageous to provide an improved chassis control arm and an improved method for the production of a chassis control arm to obviate prior art shortcomings.

SUMMARY OF THE INVENTION

According to one aspect of the present invention, a chassis control arm includes a single-piece base body of uniform material and made from an extruded hollow profile with several hollow chambers, the base body including a plurality of bearing mounts, a first one of the bearing mounts being formed by one of the hollow chambers and sized to traverse the base body to define a first bearing axis which extends in a direction in correspondence to an extrusion direction of the hollow profile, a second one of the bearing mounts being positioned in a first end portion of the base body and defining a second bearing axis which extends in a direction that deviates from the extrusion direction of the hollow profile, a third one of the bearing mounts being positioned in a second end portion of the base body, thereby configuring the chassis control arm as triangular control arm, wherein the base body has a center portion which includes the first bearing mount and is arranged between the first and second end portions, and wherein the base body has a first leg extending from the first end portion to the center portion, and a second leg extending from the second end portion to the center portion.

In accordance with the present invention, the extruded hollow profile is already configured in the extrusion process such that the cross section of one of the several hollow chambers serves as a bearing mount. For this purpose, the hollow chamber advantageously has a circular inner cross section. There is no need for a material-removing process in order to refinish the cross section of this hollow chamber. As a result, manufacture of the chassis control arm becomes inexpensive. The hollow chamber points in a predetermined direction due to the manufacturing process of the extruded profile. This direction is referred to as the extrusion direction. This extrusion direction is maintained even when the chassis control arm or the base body is bent in partial regions after extrusion. After undergoing the bending process, the extrusion direction is no longer a straight line. However, the bearing axis remains a straight line within the bearing mount and points in the extrusion direction in the region of this bearing mount.

It is possible to adjust in the area of this hollow chamber the wall thicknesses which can be realized through profiling during the extrusion process. As a result, the chassis control arm is also light in weight.

According to another advantageous feature of the present invention, the second bearing axis can extend in perpendicular relation to the extrusion direction. The second bearing mount in the first end portion is realized through a material-removing process after the hollow profile has been produced. For example, an opening, in particular a bore, is introduced transversely to the hollow profile. The bearing axes correspond to the respective press-in direction, when bearings are pressed in.

The invention does not rule out to also form the second bearing mount in a further hollow chamber, with the bearing axis of this second bearing mount also pointing in the extrusion direction. For kinematic reasons, it may however be necessary to provide bearing axes in different spatial directions. The invention is based on the assumption that at least one of the bearing axes coincides with the extrusion direction of the respective bearing mount.

The chassis control arm is configured as triangular control arm with three bearings. In accordance with the invention, provision is made for a bearing mount in a second end portion of the base body. The center portion which includes the first bearing mount is arranged between the two end portions. The base body has a first leg which extends from the first end portion to the center portion. Furthermore, the base body has a second leg, which extends from the second end portion to the center section. Advantageously, a separately manufactured bearing can be connected to the triangular control arm via the third bearing mount. In one bearing mount in the form of a bearing connection, the bearing axis can deviate from the orientation of the bearing connection, e.g. extend in perpendicular relationship. The bearing mount may, in particular, be a wall portion.

According to another advantageous feature of the present invention, the base body has opposite walls and webs interconnecting the walls to form the hollow chambers, with the webs being oriented in a longitudinal direction of the first leg. Advantageously, the opposite walls may extend parallel to one another. Due to the extrusion process, the longitudinal extension of the webs corresponds to the extrusion direction. As the webs are oriented in the longitudinal direction of the first leg, they also correspond to the extrusion direction of the longitudinal direction of the first leg. Thus, the webs extend essentially transversely to the second leg, when the second leg is arranged at an angle to the first leg.

As a chassis control arm is typically exposed locally to very different stress situations, the at least two webs of the hollow profile advantageously have a thickness that differs from one another. In an area that is exposed to greater stress, the thickness of the one of the two webs that is arranged in that area is greater than the thickness of the other one of the two webs that is arranged in an area that is exposed to a lesser stress. The term "thickness" relates hereby to a mean thickness of a web that extends between two opposite walls. The thickness of an individual web may, however, not be constant along its extension from wall to wall. For manufacturing reasons, there are transition radii between a web and a respective inner side of the wall. The thickness thus relates to the mean thickness of the web and in particular to the thickness in the central region of the web, with the assumption that the web has its smallest thickness in the central region and that the thickness can increase slightly towards the ends of the web. A different thickness exists in particular when the difference is greater than 5%, In particular greater than 10% or greater than 20%.

According to another advantageous feature of the present invention, one of the two webs can be arranged in the first leg and the other one of the two webs can be arranged in the second leg. Advantageously, the thickness of the one of the two webs is greater than the thickness of the other one of the two webs. The web in the first leg also defines a boundary between the one hollow chamber that serves as a bearing mount and the adjacent hollow chamber, which is consequently arranged in the region of the center portion and extends into the second leg.

The provision of more than two hollow chambers is, of course, conceivable. In this case, several hollow chambers or webs can be advantageously provided in the region of the center portion and in particular in the region of the first leg. The presence of webs of greater thickness and the presence of smaller distances between adjacent webs results in significant stiffening of the chassis control arm. As a result, in particular the area of the first leg is capable of absorbing very high loads, even in the case of a lightweight construction which is inexpensive to produce.

According to another advantageous feature of the present invention, the web in the first leg can be arranged in a marginal zone of the first leg. Thus, the web in the first leg effectively forms the marginal zone of the first leg. The term "marginal zone" is to be understood as relating not only to an outermost edge or length side of a wall, but also the area that is just shy (<50% of the width of the leg) of the length side. In particular, the web is slightly set back from the outer length side. The distance of the web to the longitudinal edge of the leg is at least sized enough to prevent any risk of a material-removing tool, e.g. a milling tool, to contact the respective web. As the webs are advantageously arranged in the marginal zone, i.e. relatively far to the outside, the geometrical moment of inertia of the base body and thus resistance against torsion is increased.

According to another advantageous feature of the present invention, the walls of the base body have each a marginal zone which can be configured to have at least one bent region to define a free end, with the free end of one of the walls and the free end of the other one of the walls pointing toward one another. As a result, the base body becomes closed. The facing ends can be joined to one another, in particular by a material connection (welding, soldering, gluing). In addition, the respective marginal zone of the base body can be significantly stiffened by bending the walls in the neighborhood of a web. When bending the ends, in particular a web adjacent to the ends can provide an abutment for the forming forces, so that the forming process is simplified. Another advantage is that after undergoing a material-removing process, an edge contour can be created that has a course which is partially perpendicular to the extrusion direction. The bent marginal zones can extend perpendicularly or generally at an angle to the extrusion direction and thus at an angle to the webs. This significantly improves the stiffness of the body.

According to another advantageous feature of the present invention, the second bearing mount can be sized to traverse the base body so that at least one of the webs in the base body has a profile which is breached by the first bearing mount. In this way, forces in the area of the second bearing mount can be transmitted even better. The at least one web is advantageously arranged and oriented such as to intersect the bearing mount. In particular, several of the webs may intersect the bearing mount. This creates a connection between the walls on both sides of the bearing mount. The bearing mount may, advantageously, traverse both opposite walls. A bearing sleeve inserted into the bearing mount can thus transmit the forces to be transmitted not only to the walls but also to the webs.

According to another aspect of the present invention, a method for the production of a chassis control arm includes preparing a base body with a plurality of hollow chambers of different cross sections from an extruded hollow profile, shortening a border-side one of the hollow chambers by removing material to form a first bearing mount, bending the base body into a final shape, removing material along a border side to form a first leg which extends in an extrusion direction, a center portion which adjoins the first leg, and a second leg which extends transversely or at an obtuse angle to the extrusion direction and adjoins the center portion, forming a second bearing mount in the base body such as to traverse the base body transversely to the extrusion direction, and removing a web between opposite walls of the base body in a region of the second bearing mount.

A border-side hollow chamber is particularly suitable for forming a bearing mount, because the bearing is thereby arranged on the hollow profile as exposed as possible. For manufacturing reasons, the hollow profile has hollow chambers of uniform length after extrusion. It is not necessary for a bearing mount to correspond the length of the bearing mount to the length of the entire chassis control arm. Provision is therefore made to remove border-side material of the base body in the area of this hollow chamber and thereby to configure the bearing mount only as long as necessary. This combines maximum weight savings with an inexpensive manufacturing process.

The extruded hollow profile is bent into its final shape. As described above, the hollow profile can be bent after extrusion, so that its extrusion axis in the longitudinal direction of the chassis control arm is no longer a straight line, but has a curved profile. Bending into its final shape can be implemented before and/or after undergoing the border-side material-removing process. As a result of bending, a first leg that extends in the extrusion direction can be brought into the desired position and is adjoined by the center portion which, in turn, is adjoined by the second leg at an angle to the extrusion direction. The base body is essentially L-shaped with an obtuse angle.

In accordance with the present invention, a second bearing mount is formed in the hollow profile and traverses the base body transversely to the extrusion direction. As material is removed, at least one web extending between opposite walls of the hollow profile is removed in the region of the second bearing mount. Advantageously, two or more webs are removed in the region of the bearing mount. The webs are used for better force transfer from the bearing mount to the adjacent areas of the base body. The bearing mounts can be slightly widened after undergoing the stamping process.

According to another advantageous feature of the present invention, marginal zones of the opposite walls of the base body can be bent at least in one area to thereby form free ends which point toward one another. This further stiffens the base body and results in a further mutual support of all walls.

According to another advantageous feature of the present invention, the free ends in the marginal zones of the walls can be joined at their end face, e.g. by a fusion welding process.

According to another advantageous feature of the present invention, material can be removed from an end region of the second leg to form a fork-shaped bearing mount, and a bearing can be connected via a connection element with the fork-shaped bearing mount. The configuration of the fork-shaped bearing mount is a result of the spaced-apart relationship of the walls. There is only need for a border-side contouring through a material-removing process. A bearing can be connected to the bearing mount via at least one connection element. The bearing can be, for example, a cast component or a forged component. Advantageously, a plurality of connection elements may be provided in the fork-shaped bearing mount and configured to traverse both the fork-shaped bearing mount and a fastening section of the bearing, which fastening section is sized to engage in the fork-shaped bearing mount. The various components are advantageously riveted together, with the connection elements being rivets.

A chassis control arm according to the present invention has, i.a., the advantage that the stiffness thereof can be adjusted in a targeted manner by providing webs of different thicknesses. The webs can also be referred to as stiffening ribs. The additional border-side bending or turning of the walls, which may also be referred to as the bottom or ceiling of the chassis control arm, are conducive to additionally increase stiffness. The walls are bent in particular in the area of the inner radius of the chassis control arm, i.e. in the area of the obtuse angle (90°<angle<180°) in which the two legs thereof extend in relation to one another.

A further cost reduction results from the fact that the base body can be used both as left chassis control arm and right chassis control arm. In addition, the modular design enables connection of special bearing components in the area of the fork-shaped bearing mount with the chassis control arm, in particular ball joints can be added inexpensively and connected to the chassis control arm. The use of separate bearing components enables a material mix. The base body and also the fork-shaped bearing mount may be made of an aluminum material, while the bearing component may be made of steel. Examples of aluminum alloys for the base body include aluminum alloys of the 6000 and 7000 series. Using these materials for the base body enables bearings to be pressed directly into the bearing mounts without the use of additional bearing sleeves.

The walls and the thinner webs of the base body can have a thickness of 5-8 mm, whereas the thickness of the one or more webs in the center portion or in the region of the first leg is advantageously greater by at least 20% than the thickness of the thinner web in the second leg. Individual webs can have a thickness of 10 mm, for example, whereas the walls can have a thickness of 5-8 mm.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
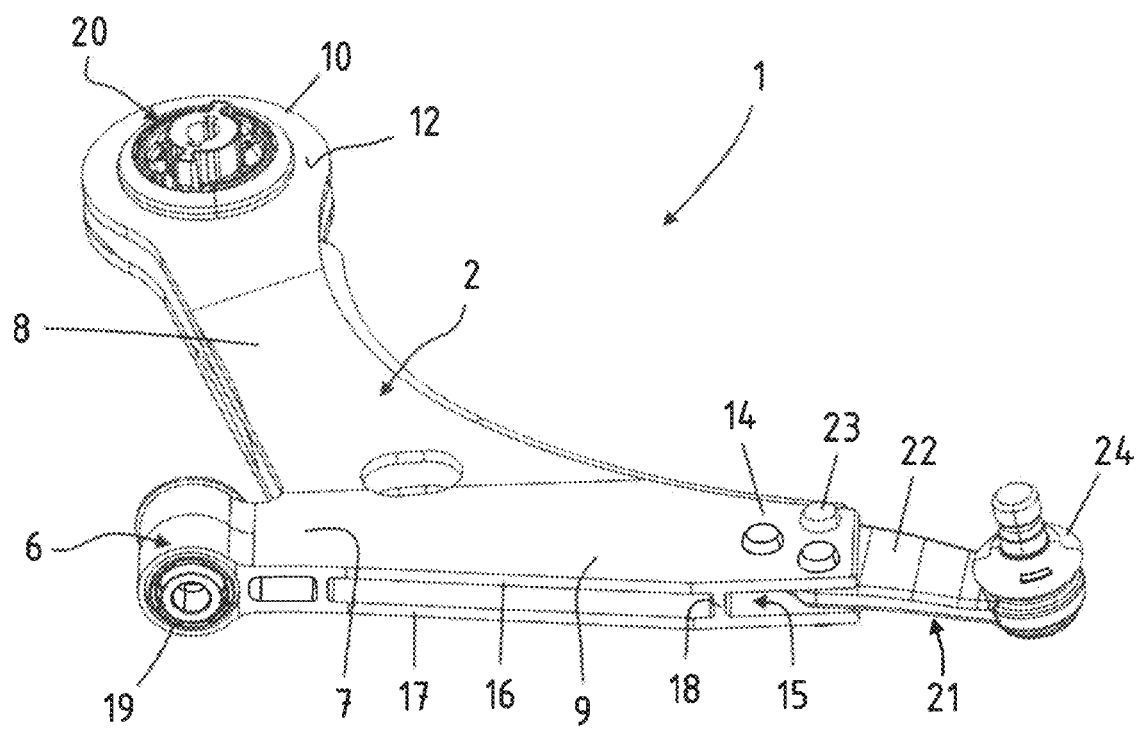
FIG. 1 is a perspective view of one embodiment of a chassis control arm according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Figure 2:
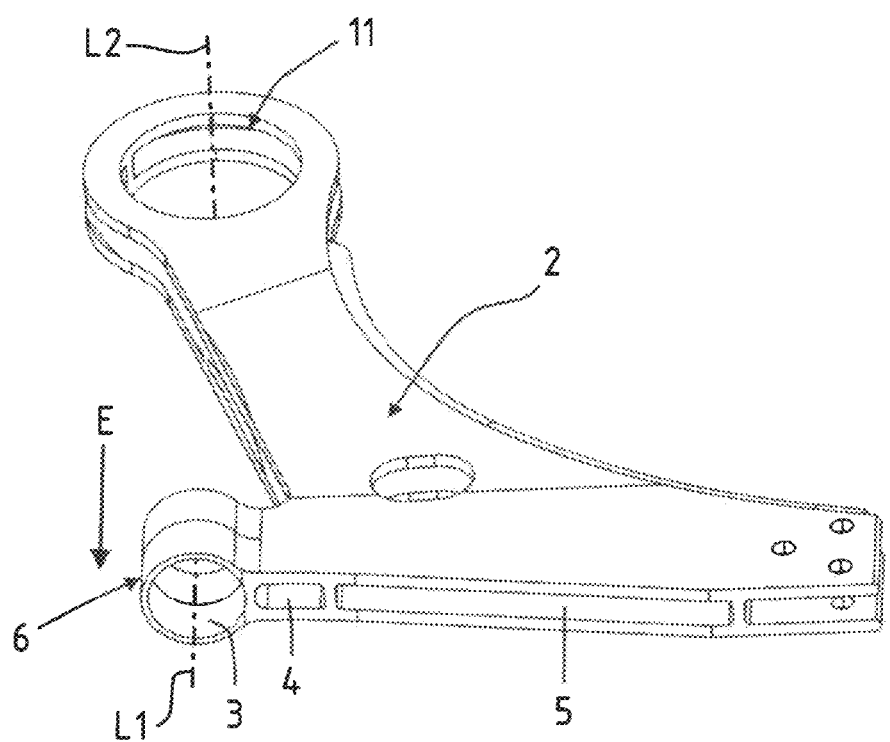
FIG. 2 is a perspective view of a base body of the chassis control arm of FIG. 1.

Turning now to the drawing, and in particular to FIG. 1, there is shown a perspective view of one embodiment of a chassis control arm according to the present invention, generally designated by reference numeral 1 and configured in the form of a triangular control arm. The chassis control arm 1 includes a base body 2 which is formed in one piece from a uniform material. The base body 2 is produced from an extruded hollow profile. FIG. 2 shows the base body 2 without attachment parts. The extruded hollow profile has a plurality of hollow chambers 3, 4, 5 (FIG. 2). The hollow chamber 3 on the left-hand side of the drawing plane is configured as a bearing mount 6 which traverses the base body 2 and represents a first bearing mount. The first bearing mount 6 defines a first bearing axis L1 extending in parallel relation to the closed wall of the hollow cylindrical hollow chamber 3. The direction of the bearing axis L1 thus corresponds to the extrusion direction E. The (local) extrusion direction is indicated here for illustration in vicinity of the bearing mount 6.

The base body 2 has a substantially L-shaped configuration and includes a center portion 7 which incorporates the first bearing mount 6. Adjoining the center portion 7 are a first leg 8 and a second leg 9. The two legs 8, 9 extend at an obtuse angle to one another and have a concavely rounded transition zone. The first bearing mount 6 is located in opposition to the concavely rounded transition zone. A second bearing mount 11 is located in a first end portion 10 of the first leg 8. The second bearing mount 11 traverses the base body 2 (FIG. 2) and defines a bearing axis L2 which extends in a direction that deviates from the extrusion direction E. In particular, the second bearing axis L2 is perpendicular to the extrusion direction E. The second bearing mount 11 is circular in cross section.

Figure 4:
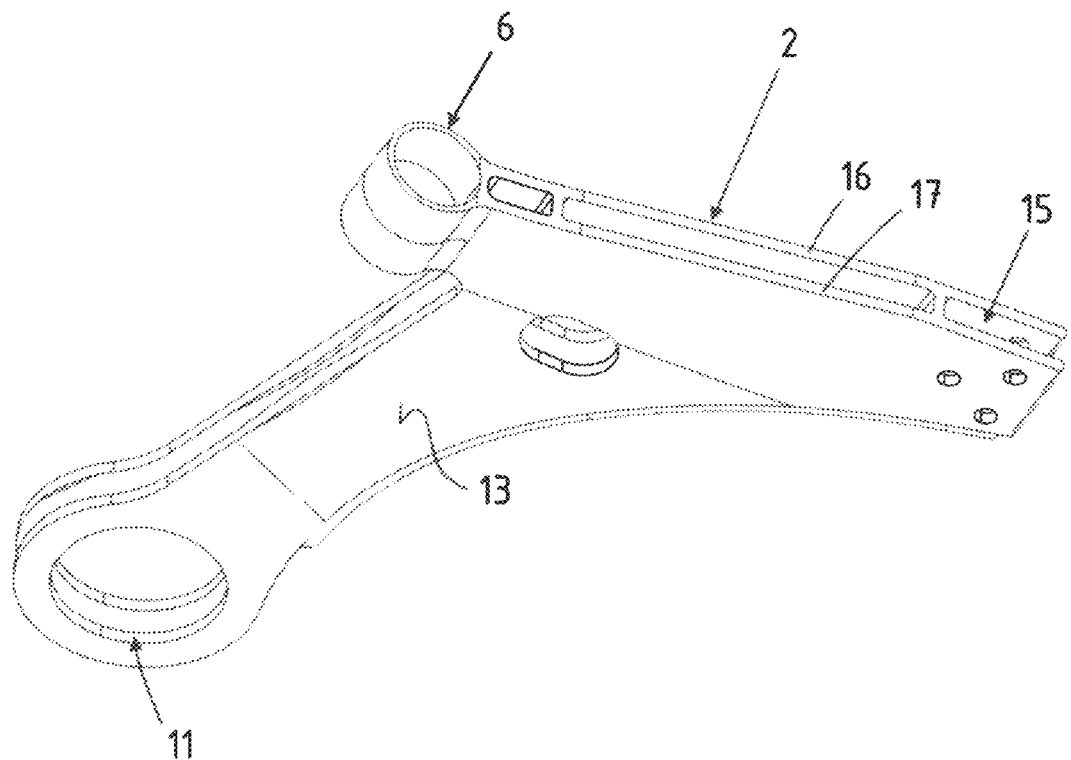
FIG. 4 is in an oblique view from below of the base body of FIG. 2.
Figure 5:
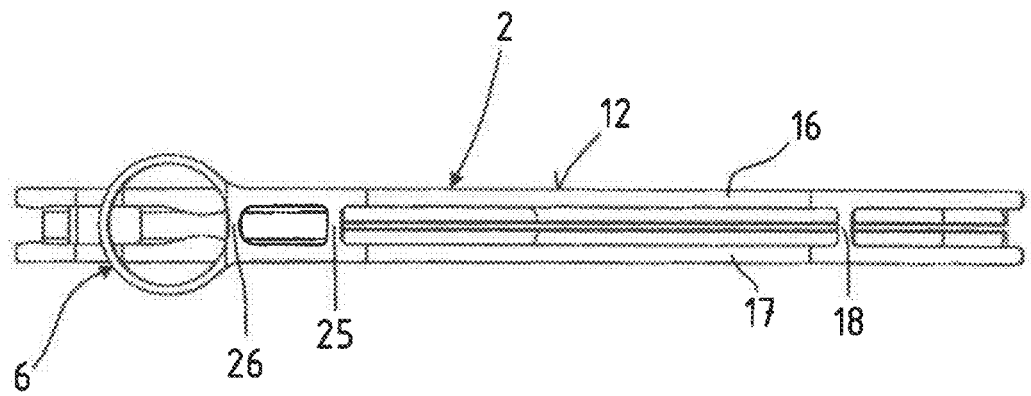
FIG. 5 is a side view of the base body of FIGS. 3 and 4 in a viewing direction of a first bearing axis.

The bearing mount 11 traverses the base body 2 from top to bottom, i.e. from a topside 12, shown in FIG. 1, to a bottom side 13, as shown in FIG. 4. The topside 12 and the bottom side 13 are flat, except for the hollow chamber 3 which forms the first bearing mount 6. The diameter of the first bearing mount 6 is greater on the inside and the outside than the distance between the topside 12 and the bottom side 13. The base body 2 of the chassis control arm 1 is therefore substantially narrower than the extruded first bearing mount 6. FIG. 5 shows a side view in viewing direction onto the first bearing mount 6 and illustrates that the diameter of the bearing mount 6 is significantly greater than the thickness of the base body 2 in the remaining areas.

A third bearing mount 15 is arranged on a second end portion 14, which is located on the second leg 9 at a distance from the center portion 7. The third bearing mount 15 has a fork-shaped configuration at the end portion 14 and is formed by two opposite walls 16, 17, which bound the topside 12 and the bottom side 13 of the chassis control arm 1. The walls 16, 17 extend parallel to one another and are connected to one another via a first web 18. This web 18 is located at a distance from the outer end of the end portion 14, so that the walls 16, 17 continue beyond the web 18 into the region of the end portion 14 and thus form the forked bearing mount 15.

FIG. 1 shows that bearings 19, 20 are pressed into the bearing mounts 6, 11 and that a bearing 21 is fastened to the bearing mount 15. The bearings 19, 20, 21 are rubber-metal bearings.

The bearing 21 on the third bearing mount 15 has an arm 22 which engages in the bearing mount 15 and is connected there via three rivets 23 to the walls 16, 17 and thus to the base body 2. At its free end, the arm 22 has a bearing journal 24 which is inwardly bent relative to the arm 22 and is movably supported relative to the arm 22 of the bearing 21 via a rubber bearing.

Figure 3:
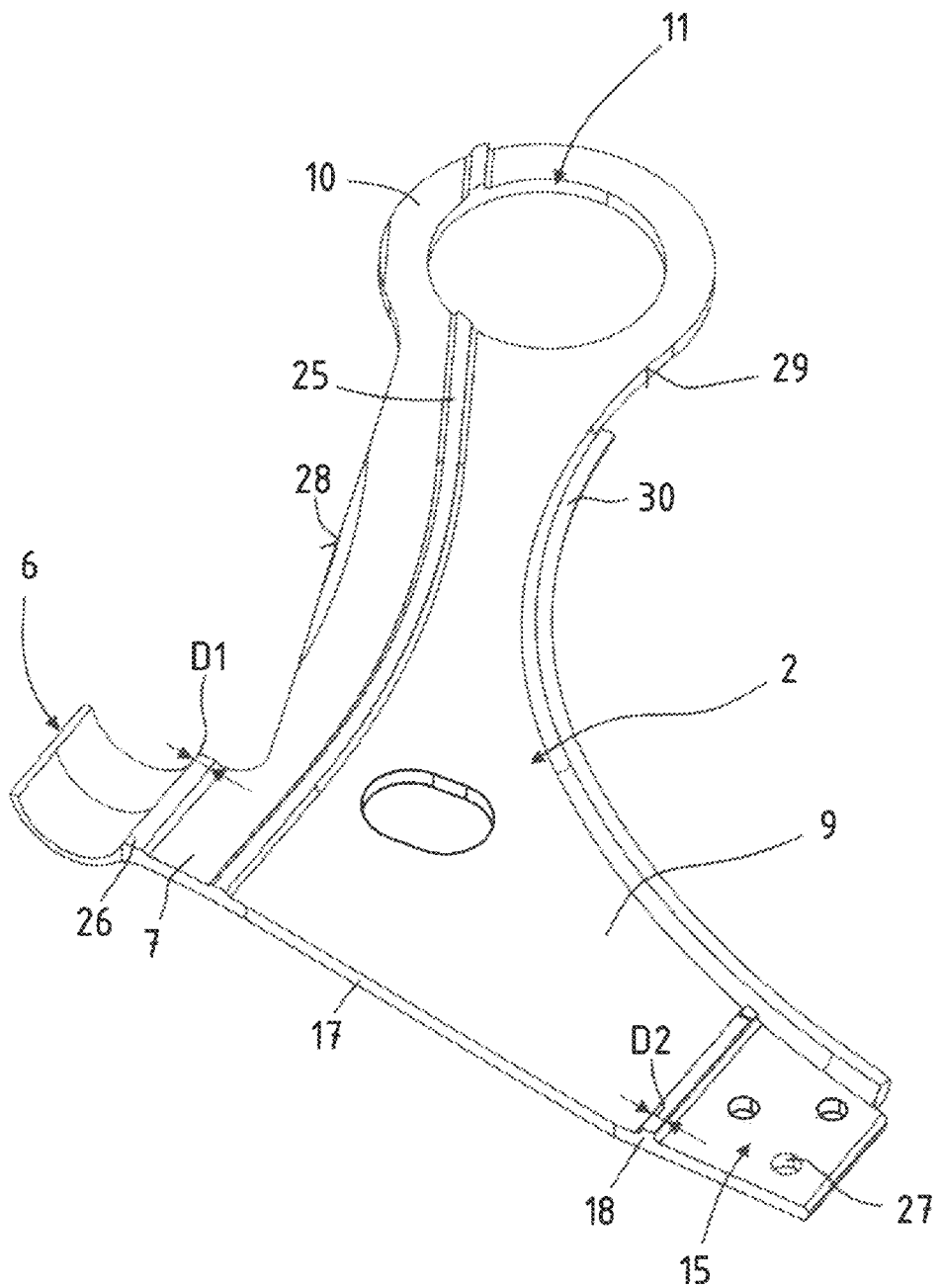
FIG. 3 is a horizontal longitudinal section of the base body of FIG. 2.

Referring now to FIG. 3, which is a horizontal longitudinal section of the base body 2 of FIG. 2, it is readily apparent that the chassis control arm 1 has, in addition to the first web 18 adjacent to the bearing mount 15, a further web 25 which extends from the center portion 7 into the end portion 10 of the first leg 8. The web 25 is substantially longer than the web 18 and is curved in the shape of an arc, as the chassis control arm 1 has been bent after or during extrusion. The extrusion direction of the web 25 still corresponds to the course of the web 25.

A desired border contour of the chassis control arm 1 is realized by a material-removing process, in particular machining. FIG. 3 shows openings 27 in the area of the bearing mount 15 for passage of connection elements 23, in particular rivets. As is further readily apparent from FIG. 3, the longer, curved web 25 extends in the region of the second bearing mount 11 and intersects the bearing mount 11 off-center. The bearing mount 11 therefore not only traverses the respective walls 16, 17, but also the web 25.

Figure 6:
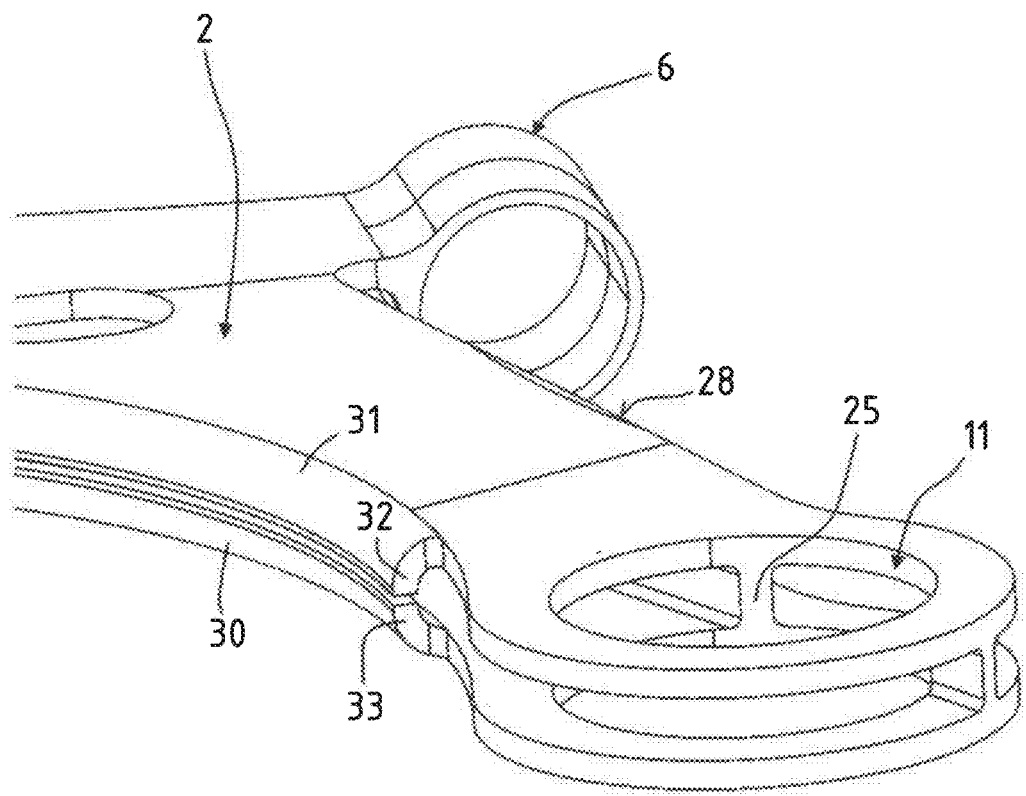
FIG. 6 is an enlarged detailed view of the base body in a perspective representation.

FIG. 3 further shows the presence of a third web 26 to form the transition to the first bearing mount 6. The third web 26 has a thickness D1 which is greater than the thickness D2 of the first web 18, which is arranged at a distance from the center portion 7. In addition, the distance between the second and third webs 25, 26 is smaller than the distance between the first web 18 and the second web 25. As a result, the central hollow chamber 5 (FIG. 2) is substantially greater in cross section than the hollow chamber 4 adjacent to the bearing mount 6. In the area of the bearing mount 6 and in the area of the center portion 7, increased stiffness can be achieved. In addition, the web 25 extends in the vicinity of a border region 28 of the first leg 8. While running at a certain distance from the border region 28, the web 25 increasingly approaches the border region in particular in the transition to the center portion 7 and also in the area of the first end portion 10 with the second bearing mount 11. In the central region of the first leg 8, the distance is slightly increased due to the arcuate course, while the border side 28 of the first leg 8 runs essentially straight. This border side 28 can also be referred to as the outer side of the first leg 8. The opposite inner side 29 is curved in an arc. The arc shape flows smoothly and without jumps from the first leg 8 into the second leg 9. This inner side 29 can also be referred to as the curved side or concave side. In the presence of even more webs or stiffening ribs, a web can also be arranged in the border region. In this exemplary embodiment, there is no web on this inner side 29, but two border regions 30, 31 approach one another by bending the outer border regions 30, 31 on the upper and lower walls 16, 17. In this exemplary embodiment, both border regions 30, 31 are bent in a same way. Their opposite free ends 32, 33 point to each other. In a manner not shown in detail, these free ends 32, 33 of the walls 16, 17 can be joined to one another, in particular welded to one another (FIG. 6).

FIG. 5 is a side view of the base body 2 of FIGS. 3 and 4 in a viewing direction of the first bearing axis L1 and shows the two walls 16, 17 being connected to one another at several locations, i.e. via the webs 18, 25, 26 of different thicknesses, with the web 18 having a thickness D2 of 5 to 8 mm, and at least the web 26 having a thickness D1 of approximately 8 to 10 mm. The intermediate web 25 may also have a thickness of 8 to 10 mm. The walls 16, 17 of the base body 2 have a substantially constant wall thickness. Only the area of the first bearing mount 6 can have a wall thickness that is significantly reduced, e.g. essentially halved. Thickenings of the walls 16, 17 are also established at the outer border side 28 of the first leg 8 as a result of upsetting of the base body 2 as the first leg 8 is bent in relation to the second leg 9.

The chassis control arm 1 can be used both for a left side and for a right side of a motor vehicle. The base body 2 is mirror-symmetrical with respect to its sectional plane shown in FIG. 3 with respect to the topside and bottom side. The base body 2 can be produced inexpensively through extrusion and subsequent forming and material-removing processes. During the material-removing process, the first hollow chamber 3 of the hollow profile in particular is shortened to such an extent that only the afore-described first bearing mount 6 remains, which, when viewed approximately in the direction of its longitudinal axis L1, has a same length as the bearing mount 15 at the second end portion 14 of the second leg 9. The chassis control arm 1 is particularly suitable as a lower control arm of a McPherson strut. The chassis control arm 1 may be produced from an aluminum alloy of 6000 or 7000 series.

Figure 7:
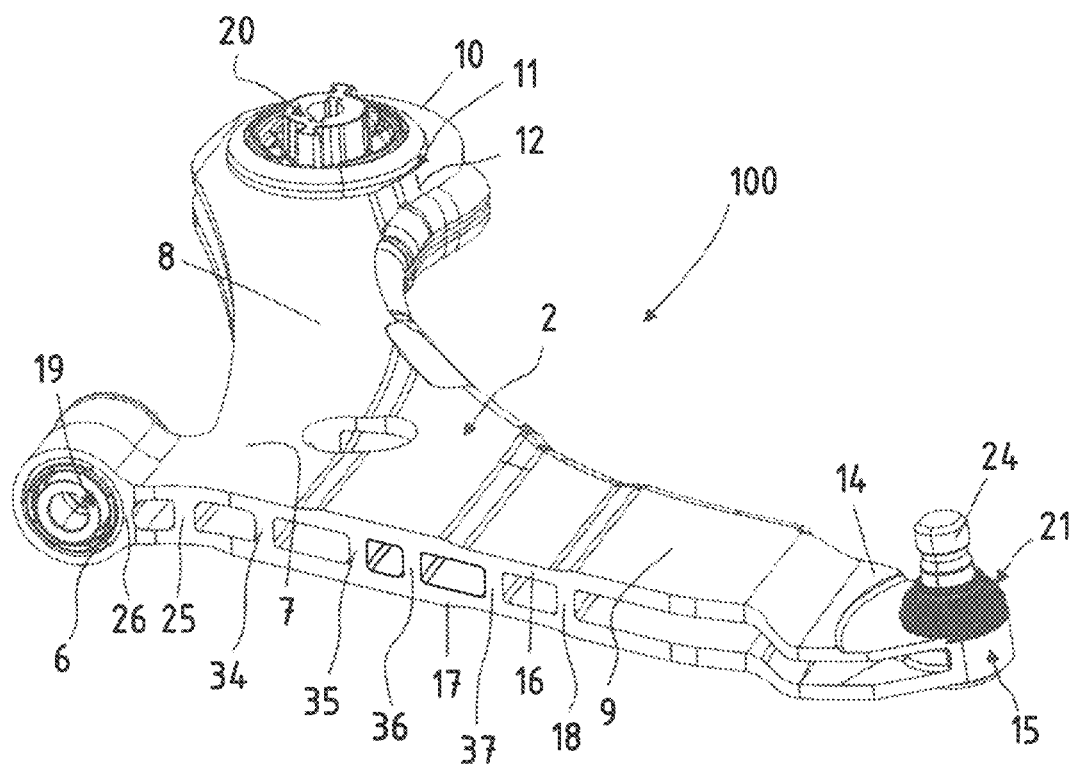
FIG. 7 is a perspective view of another embodiment of a chassis control arm according to the present invention.

FIG. 7 shows a perspective view of another embodiment of a chassis control arm, generally designated by reference numeral 100. Parts corresponding with those in FIGS. 1 to 6 are denoted by identical reference numerals and not explained again. The description below will center on the differences between the embodiments. In this embodiment, provision is made for further webs 34, 35, 36, 37 and thus further hollow chambers in the chassis control arm 100. As a result, the base body 2 can be stiffened further. Since an extrusion profile is involved, there is no need for an additional manufacturing step in order to produce the further webs 34, 35, 36, 37.

Another difference to the first exemplary embodiment shown in FIGS. 1 to 6 involves the integration of the third bearing mount 15 directly into the chassis control arm 100, i.e. the bearing mount 15 is configured as a further through opening in the base body 2. The bearing mount 15 is oriented in such a way that a bearing 21 with a bearing journal 24 does not have to be bolted on via additional connection elements, but rather can be pressed directly into the base body 2, as shown in FIG. 7.

FIG. 7 further shows that the thickness of the walls 16, 17 can vary transversely to the extrusion direction. Immediately opposite wall portions can be thicker or thinner in at least one area. It is also possible that only one of the two walls 16, 17 may have at least one area of varying thickness.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A triangular chassis control arm, comprising:
a single-piece base body of uniform material and made from an extruded hollow profile with several hollow chambers, said base body having a plurality of bearing mounts and a first lea extending from a first end portion of the base body to a center portion of the base body, with the center portion arranged between the first and a second end portion and including a first one of the plurality of bearing mounts, and a second lea extending from the second end portion of the base body to the center portion of the base body,
the first one of the plurality of bearing mounts being formed by one of the hollow chambers and sized to traverse the base body to define a first bearing axis which extends in a direction in correspondence to an extrusion direction of the hollow profile, said extrusion direction defining a longitudinal direction along a longitudinal length of the first leg that is substantially aligned with a first border region of the first leg,
a second one of the plurality of bearing mounts being positioned in the first end portion of the base body and defining a second bearing axis which extends in a direction that deviates from the extrusion direction of the hollow profile, and
a third one of the plurality of bearing mounts being positioned in the second end portion of the base body.

2. The chassis control arm of claim 1, wherein the base body has opposite walls and webs interconnecting the walls to form the hollow chambers, said webs being oriented along the longitudinal length of the first leg, wherein at least two of the webs have a thickness that differs from one another.

3. The chassis control arm of claim 2, wherein one of the two webs is arranged in the first leg and the other one of the two webs is arranged in the second leg, with the thickness of the one of the two webs being greater than the thickness of the other one of the two webs.

4. The chassis control arm of claim 3, wherein the one of the two webs is arranged in the first border region of the first leg.

5. The chassis control arm of claim 2, wherein the opposite walls of the base body have each a second border region configured to have at least one bent region to define a free end, with the free end of one of the walls and the free end of the other one of the walls pointing toward one another.

6. The chassis control arm of claim 5, wherein the free ends of the bent second border regions of the walls are joined together.

7. The chassis control arm of claim 2, wherein the second bearing mount is sized to traverse the base body, at least one of the webs having a profile which is breached by the first bearing mount.

8. A method for the production of a chassis control arm, comprising:
preparing a base body with a plurality of hollow chambers of different cross sections from an extruded hollow profile;
shortening a border-side one of the hollow chambers by removing material to form a first bearing mount;
bending the base body into a final shape;
removing material along a border side to form a first leg which extends in an extrusion direction, a center portion which adjoins the first leg, and a second leg which extends transversely or at an obtuse angle to the extrusion direction and adjoins the center portion;
forming a second bearing mount in the base body such as to traverse the base body transversely to the extrusion direction; and
removing a web between opposite walls of the base body in a region of the second bearing mount.

9. The method of claim 8, further comprising bending border regions of the opposite walls of the base body at least in one area to thereby form free ends which point toward one another.

10. The method of claim 9, further comprising joining the free ends in the border regions of the walls at their end faces.

11. The method of claim 8, further comprising:
removing material from an end region of the second leg to form a fork-shaped bearing mount; and
connecting a bearing via a connection element with the fork-shaped bearing mount.

* * * * *

UNITED STATES PATENT AND TRADEMARK OFFICE
CERTIFICATE OF CORRECTION

| | | |
|---|---|---|
| PATENT NO. | : 11,571,940 B2 | Page 1 of 1 |
| APPLICATION NO. | : 16/998757 | |
| DATED | : February 7, 2023 | |
| INVENTOR(S) | : Stephan Meyer et al. | |

It is certified that error appears in the above-identified patent and that said Letters Patent is hereby corrected as shown below:

In the Claims

In Column 9, Claim 1, Line 22: replace "a first lea extending" with -- a first leg extending --.

In Column 9, Claim 1, Line 26: replace "a second lea extending" with -- a second leg extending --.

Signed and Sealed this
Twenty-fifth Day of April, 2023

*Katherine Kelly Vidal*

Katherine Kelly Vidal
*Director of the United States Patent and Trademark Office*